UNITED STATES PATENT OFFICE.

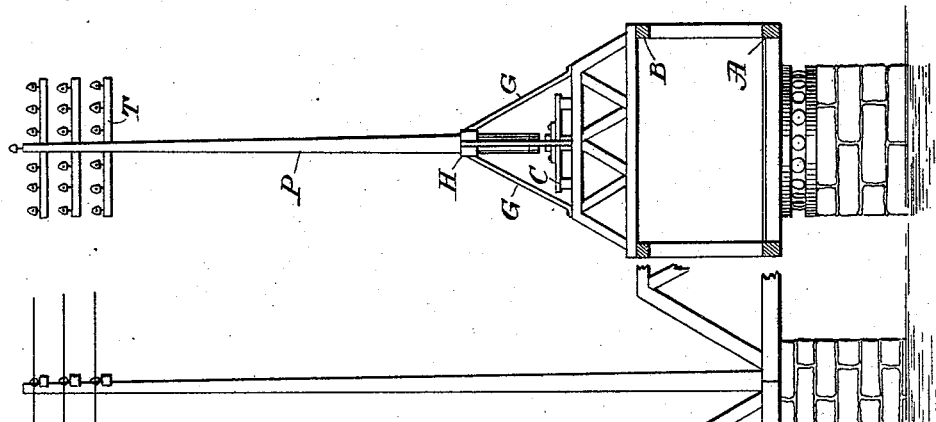
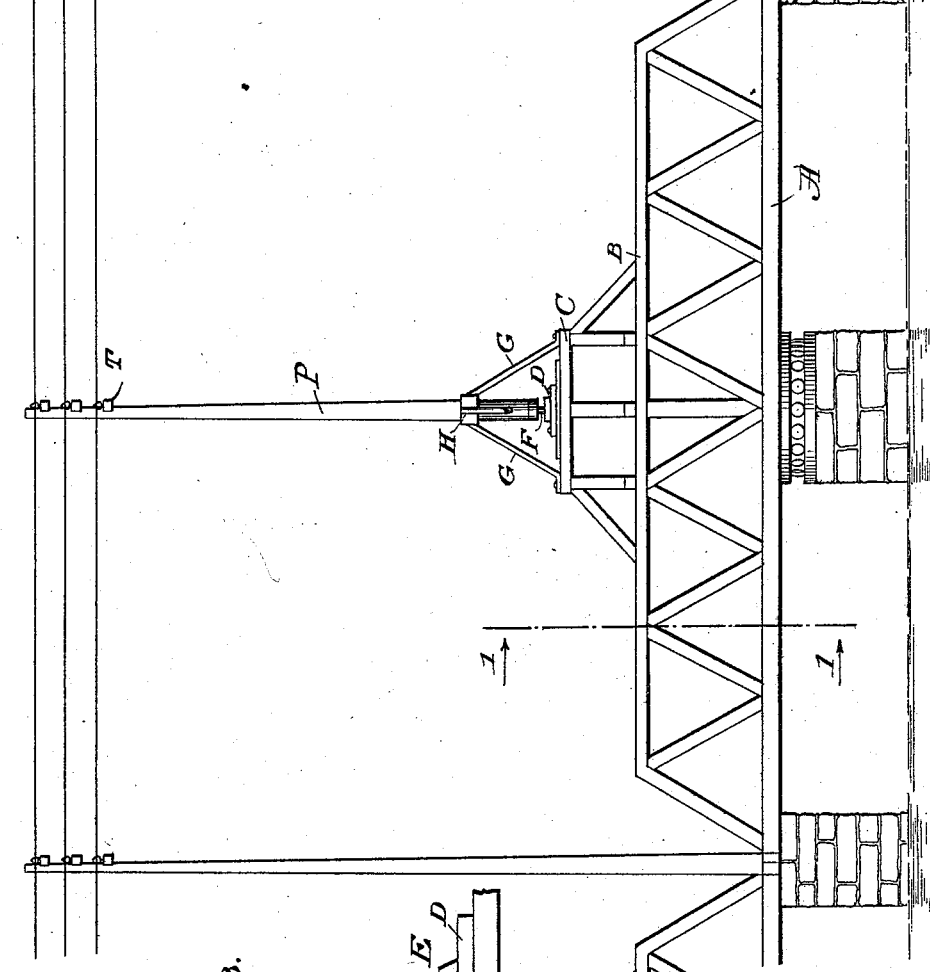
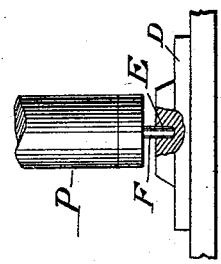

JOHN B. SCACE, OF ALBANY, NEW YORK.

WIRE-SUPPORT ON DRAWBRIDGES.

SPECIFICATION forming part of Letters Patent No. 485,662, dated November 8, 1892.

Application filed June 22, 1892. Serial No. 437,673. (No model.)

*To all whom it may concern:*

Be it known that I, JOHN B. SCACE, a citizen of the United States, residing at the city and county of Albany, State of New York, have invented a new and useful Improvement in Apparatus for Supporting Wires over a Drawbridge, of which the following is a specification.

My invention relates to improvements in supports for wires; and the object of my invention is to provide a device for supporting telegraph, telephone, and trolley wires upon the draw of a bridge in such a manner that the draw may be opened without interfering with the overhanging wires. I accomplish this object by means of the mechanism illustrated in the accompanying drawings, in which—

Figure 1 is a side elevation of a drawbridge provided with my invention. Fig. 2 is a section along the lines I I on Fig. 1, and Fig. 3 is a detail view showing the manner of supporting the pole.

Similar letters refer to similar parts throughout the several views.

A represents the draw of a bridge, which draw is closed, as shown in Fig. 1. Along the side of the draw is a suitable truss structure B. Upon the truss structure B, I secure in any suitable manner the raised platform C. To the platform C, I secure the plate D, within the top of which I construct a recess E, forming a support and bearing for the pivot F on the end of the pole P. To the platform C, I attach the arms G, extending upward and secured at their upper ends to the collar H, which collar H is placed about the pole P in such a manner as to provide a support for the pole and at the same time allow for the movement of the collar about the pole. The pole P is provided with suitable cross-trees T, upon which the wires to be carried are suitably connected.

The operation of my invention is apparent. The pole P when the draw is open does not turn with the draw, the supports or arms G cause the collar H to move about the pole, and the bearing E moves about the pivot F on the end of the pole, leaving the pole stationary and the wires attached thereto unaffected by the movement of the draw.

My invention is extremely simple and enables the carriage of wires over the draw of a drawbridge instead of sinking them into the river, as is now the custom. It also provides a means for the operation of electric cars upon drawbridges without constructing a tower, as is usually done at present.

What I claim as my invention, and desire to secure by Letters Patent, is—

1. In an apparatus for supporting wires over a draw of a drawbridge, the combination of a pole provided at its lower end with a pivot, a suitable bearing for said pivot, supports for said pole, with wires connected with the pole near the top, substantially as described, and and for the purpose set forth.

2. In an apparatus for supporting wires over the draw of a drawbridge, the combination of a pole, a pivot attached to the lower end of said pole, a collar placed about said pole, a bearing in which said pivot is placed, with arms connecting said collar with suitable supports, substantially as described, and for the purpose set forth.

JOHN B. SCACE.

Witnesses:
FREDERICK W. CAMERON,
ALFRED A. GUTHRIE.